United States Patent
Wu

(10) Patent No.: US 7,134,264 B2
(45) Date of Patent: Nov. 14, 2006

(54) ADJUSTABLE CONNECTOR FOR A LAWN RAKE

(75) Inventor: Kan-Liang Wu, Yunlin Hsien (TW)

(73) Assignee: Wen-Chun Chen (TW)

( * ) Notice: Subject to any disclaimer, the term of this patent is extended or adjusted under 35 U.S.C. 154(b) by 0 days.

(21) Appl. No.: 11/076,894

(22) Filed: Mar. 11, 2005

(65) Prior Publication Data

US 2006/0201127 A1 Sep. 14, 2006

(51) Int. Cl.
*A01D 7/00* (2006.01)

(52) U.S. Cl. .................................................. 56/400.17

(58) Field of Classification Search ................... D8/13; 56/400.17, 400.18, 400.2, 400.19, 400.1, 56/400.01, 400.04, 400.21

See application file for complete search history.

(56) References Cited

U.S. PATENT DOCUMENTS

| 2,481,442 | A | * | 9/1949 | Paul | 56/400.17 |
| 3,668,849 | A | * | 6/1972 | Bunker | 56/400.17 |
| 4,376,367 | A | * | 3/1983 | Rocquin | 56/400.17 |
| D282,900 | S | * | 3/1986 | Salvato | D8/13 |
| 5,033,261 | A | * | 7/1991 | Bonnes et al. | 56/400.17 |

* cited by examiner

*Primary Examiner*—Árpád Fábián Kovács
(74) *Attorney, Agent, or Firm*—Hershkovitz & Associates; Abe Hershkovitz

(57) ABSTRACT

An adjustable connector for a lawn rake has a sleeve, a rake head and a lever. The rake head is connected in front of the sleeve. The lever is attached pivotally to the sleeve and has a cam head operationally pressing against a shaft of the lawn rake when the lever is pivoted to lock the handle in the sleeve. By directly pressing the cam head of the lever against the handle, other accessories such as separate compression clamps in the prior art are obviated so that the structure of the adjustable connector is simplified.

4 Claims, 6 Drawing Sheets

ADJUSTABLE CONNECTOR FOR A LAWN RAKE

BACKGROUND OF THE INVENTION

1. Field of the Invention

The present invention relates to an adjustable connector for a lawn rake, and more particularly to an adjustable connector that has a simple structure to make manufacturing the adjustable connector easy.

2. Description of Related Art

With reference to FIGS. 5 and 6, a conventional adjustable connector for a lawn rake substantially comprises a sleeve (50), a locking device, and a rake head (70) attached to the sleeve (50).

The sleeve (50) is tubular, is attached around a handle (80) of the lawn rake and has a sidewall (not numbered), two wings (52) and a through hole (502). The wings (52) extend down from the sidewall of the sleeve (50) in parallel and have a pin (522) and a front edge. The pin (522) is mounted transversely through the wings (52). The through hole (502) is defined transversely through the sidewall between the two wings (52).

The locking device is mounted between the two wings (52) and has a lever (60) and a compression clamp (62). The lever (60) is pivotally mounted between the wings (52) and has a proximal end, a distal end, a head and a handle. The proximal end is pivotally attached to the two wings (52) with the pin (522). The head is formed on the proximal end and is a cam. The compression clamp (62) is a parallelepiped, is mounted movably in the through hole (502), has a curved inner face and is clamped between the handle (80) and the head of the lever (60). The curved inner face of the compression clamp (62) corresponds to the handle (80).

The rake head (70) is attached to the front edge of the two wings (52) and a tine block and multiple flexible or semi-flexible tines (72). The tine block is an elongated parallelepiped and has a front edge and a rear edge. The rear edge is attached to the front edge of the wings (52). The flexible or semiflexible tines (72) are mounted pivotally in the tine block and extend out from the front edge of the tine block.

The conventional connector attaches the rake head (70) to the handle (80) by pivoting the lever (60) essentially parallel to the handle (80) to push the compression clamp (62) tightly against the handle (80). The connector releases the handle (80) by pivoting the lever (60) away from the handle (80) to release the compression clamp (62) and removing the handle (80) from the sleeve (50). However, the locking device has at least two elements including the lever (60) and the compression clamp (62), and manufacturing and assembly of the lawn rack are not simple.

The present invention has arisen to mitigate or obviate the disadvantages of the conventional adjustable connector for a lawn rake.

SUMMARY OF THE INVENTION

The main objective of the present invention is to provide an adjustable connector for a lawn rake that has a simple structure to reduce manufacturing cost.

Further benefits and advantages of the present invention will become apparent after a careful reading of the detailed description with appropriate references to the accompanying drawings.

DETAILED DESCRIPTION OF THE PREFERRED EMBODIMENT

Figure 1:
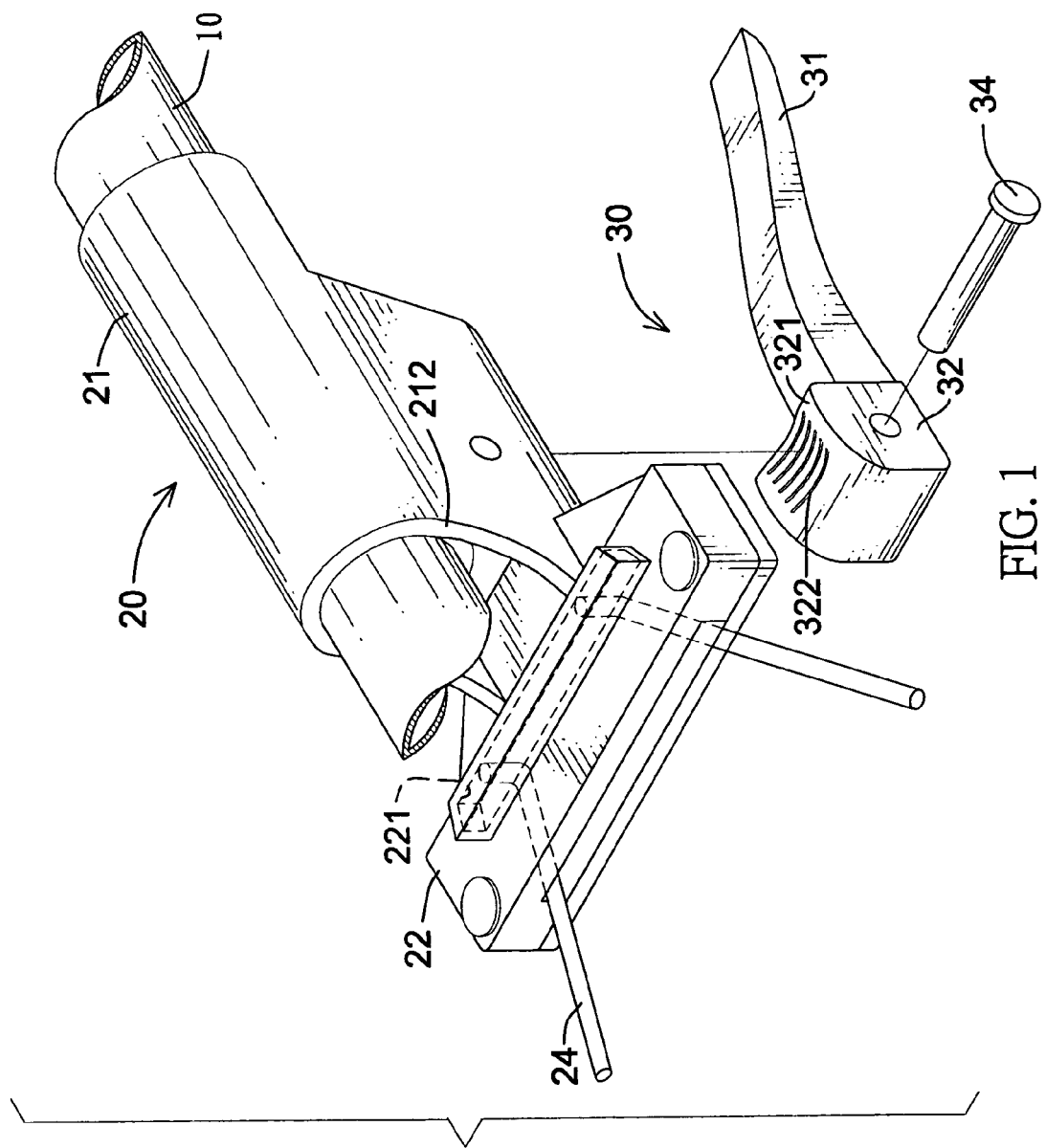
FIG. 1 is a partially exploded perspective view of an adjustable connector for a lawn rake in accordance with the present invention.

With reference to FIG. 1, an adjustable connector (20) for a lawn rake in accordance with the present invention comprises a sleeve (21), a rake head (not numbered) and a lever (30). The rake head is connected in front of the sleeve (21). The lever (30) is attached pivotally to the sleeve (21) and has a cam head (32) operationally pressing against a handle (10) of the lawn rake when the lever (30) is pivoted to lock the handle (10) in the sleeve (21). By directly pressing the cam head (32) of the lever against the handle (10), other accessories such as a separate compression clamp in the prior art are obviated so the structure of the adjustable connector (20) is simplified.

Figure 2:
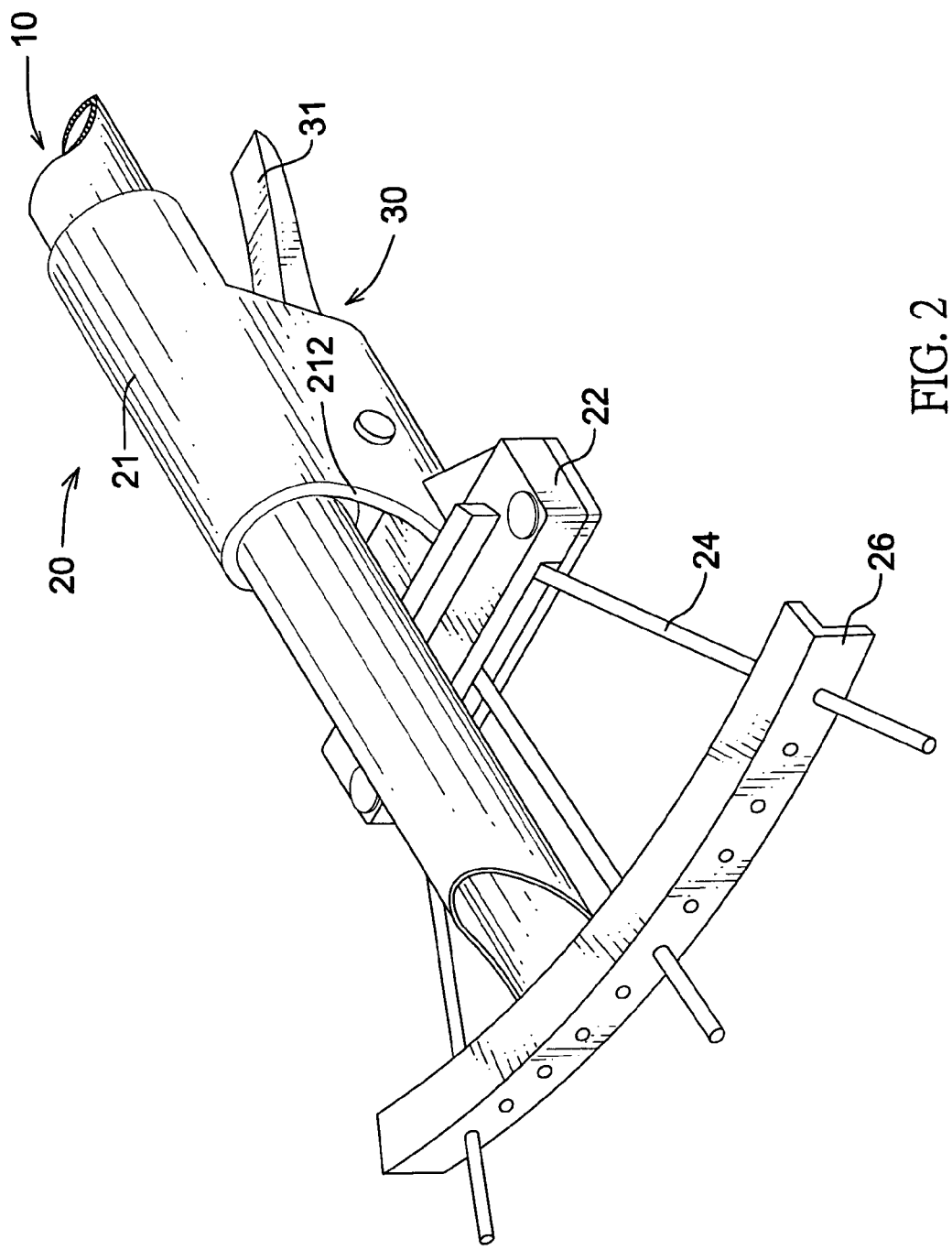
FIG. 2 is a perspective view of the adjustable connector in FIG. 1 connected to a handle.
Figure 3:
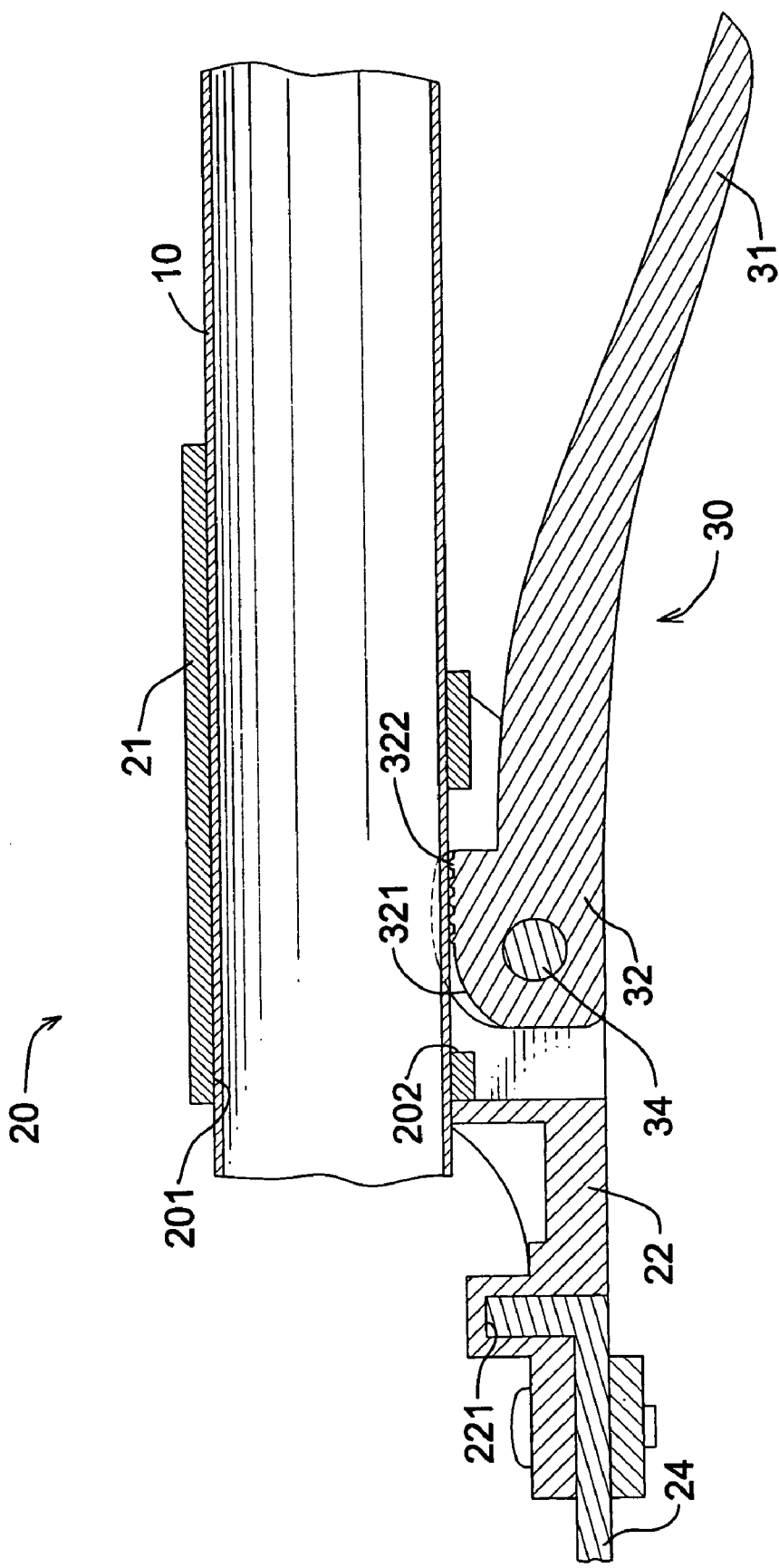
FIG. 3 is an operational cross-sectional side view of the adjustable connector and the handle in FIG. 2 with the handle locked in the adjustable connector.

With further reference to FIGS. 2 and 3, a preferred embodiment of the adjustable connector (20) in accordance with the present invention has a sleeve (21), a lever (30) and a rake head.

The sleeve (21) is tubular, is mounted slidably around a handle (10) of the lawn rake and has a front end (not numbered), a sidewall (not numbered), two wings (212), a pin (34) and a through hole (202). The wings (212) extend down from the sleeve (21), and each wing (212) has a front edge (not numbered) and a pinhole (not numbered). The pinholes in the wings (212) are aligned with each other. The pin (34) is mounted in the pinholes in the wings (212). The through hole (202) is defined through the sidewall of the sleeve (21) between the two wings (212) and is aligned with the pinholes in the wings (212).

The lever (30) is pivotally mounted on the pin (34) between the two wings (212). The lever (30) has a proximal end (not numbered), a distal end (not numbered), an enlarged cam head (32) and an elongated tab (31).

The enlarged cam head (32) is formed integrally on the proximal end, is mounted pivotally on the pin (34) between the wings (212), extends rotatably into the through hole (202) in the sleeve (21), is substantially a rectangular block and has an inner surface (not numbered), a pivot hole (not numbered), a curved compression face (321) a front face (not numbered), a rear face (not numbered) and multiple optional ribs (322). The pivot hole (not numbered) is defined transversely through the cam head (32) and is mounted on the pin (34) so that the cam head (32) is pivotally mounted in the two wings (212). The curved compression face (321) is formed on the inner surface and protrudes rotatably into the through hole (202) in the sleeve (21). The multiple optional ribs (322) are formed on the curved compression face (321) to grip the handle (10) more securely. The front face is adjacent to the curved compression face (321) and has a curved inner edge (not numbered) communicating with the curved compression face (321) to make rotating the lever

(30) easy when transitioning to contact with the handle (10) by the curved compression face (321).

The elongated tab (31) is formed on and protrudes out from the rear face of the cam head (32) to pivot the cam head (32) on the pin (34).

The rake head is attached to the front of the sleeve (21) and may be connected to the front edges of the two wings (212) and has a base (22), multiple tines (24) and a tine separator (26). The base (22) is wide, is attached to the front edges of the wings (212) and has a bottom (not numbered), a longitudinal center (not numbered), a front face (not numbered), a rear face (not numbered) and a tine recess (221). The front face has an opening (not numbered). The tine recess (221) is L-shaped and wide, is formed in the bottom of the base (22), extends from the longitudinal center of the base (22) to the front face and defines the opening in the front face of the base (22). The tines (24) extend forward from the tine recess (221). Each tine (24) has a proximal end (not numbered) and a distal end (not shown). The proximal end is L-shaped, corresponds to the tine recess (221) and is mounted securely and pivotally in the tine recess (221). The tine separator (26) is a curved L-shaped bar, is mounted on and separates the multiple tines (24) with multiple holes (not numbered). The holes are slidably mounted respectively around the tines (24). When the lawn rake is assembled, the tine separator (26) attaches to the shaft (10) so the distal ends of the tines (24) can be drawn more closely together by the tine separator (26) when the sleeve (21) slides backward on the handle (10).

Figure 4:
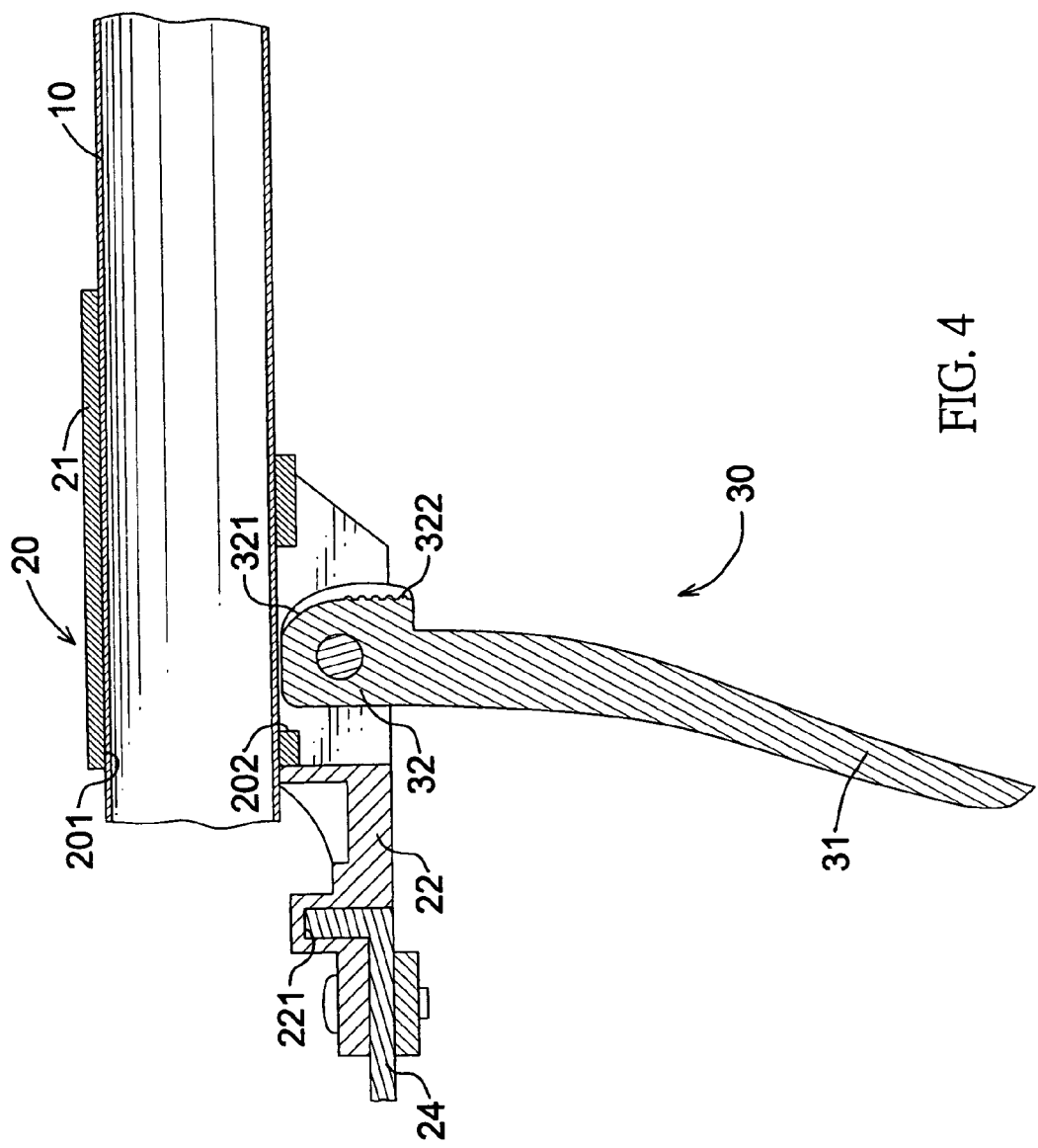
FIG. 4 is another operational cross-sectional side view of the adjustable connector and the handle in FIG. 2 with the handle released from the adjustable connector.
Figure 5:
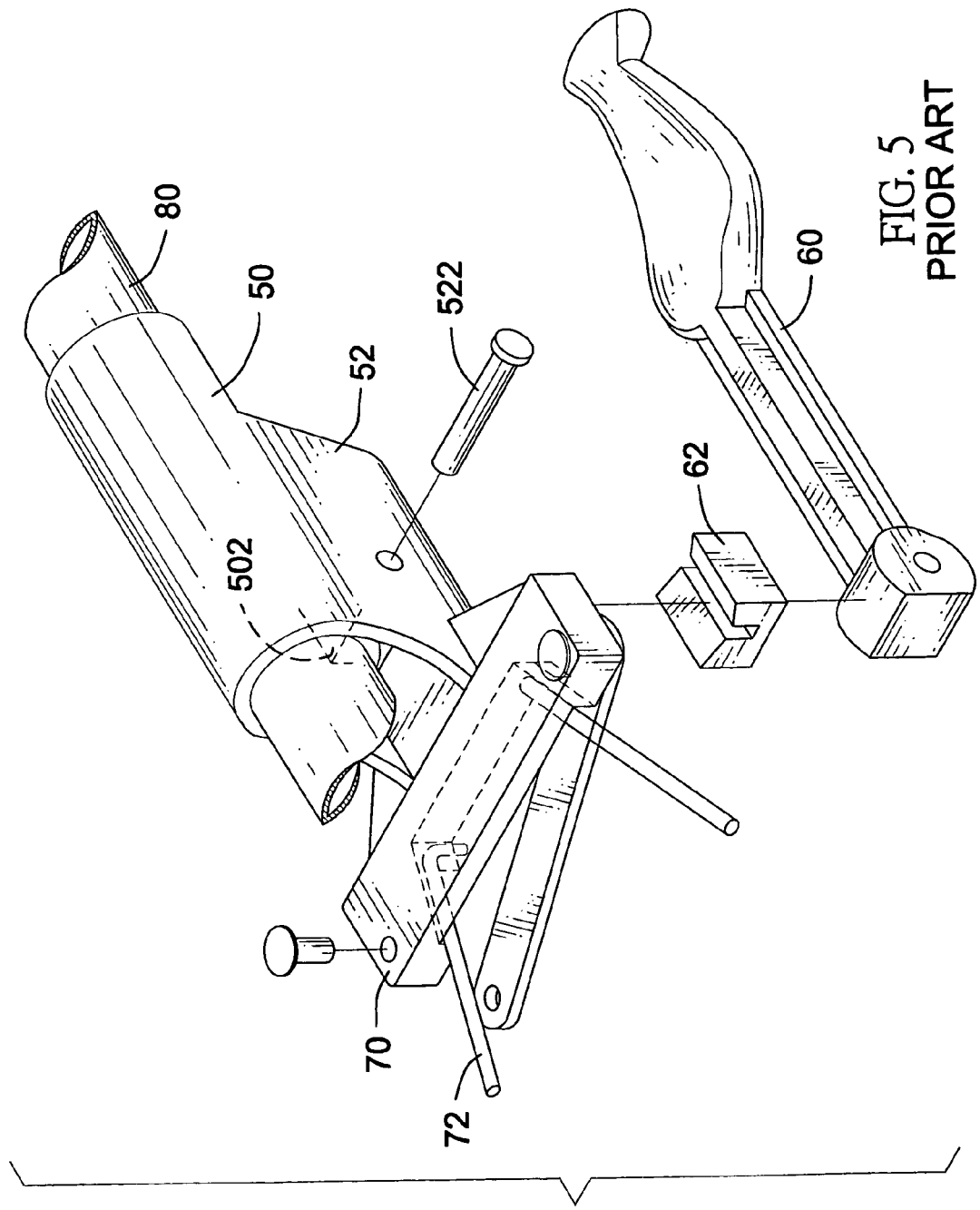
FIG. 5 is a partially exploded perspective view of a conventional adjustable connector in accordance with the prior art.
Figure 6:
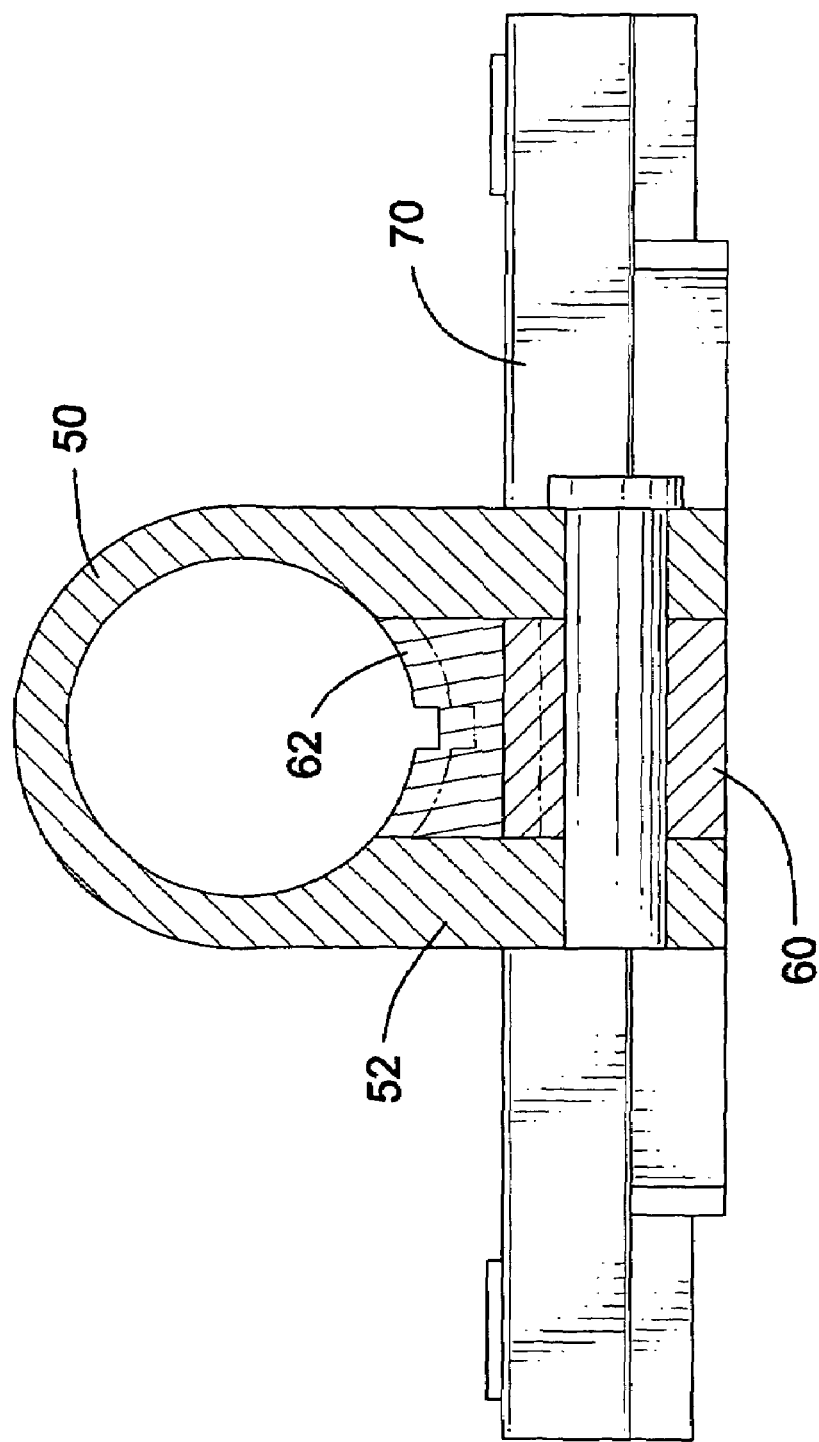
FIG. 6 is an operational cross-sectional end view of the conventional adjustable connector in FIG. 5.

With reference to FIGS. 3 and 4, a person adjusts the separation of the tines (24) by sliding the connector (20) on the handle (10) until the distal ends of the tines (24) have the desired separation. Then, the lever (30) is pivoted to a locking position parallel with the handle (10) and the curved compression face (321) snugly presses against the handle (10). Therefore, the adjustable connector (20) can be located in any position to adjust the width of the rake head.

The connector (20) can lock onto or unlock from the handle (10) easily in a convenient way. With regard to the manufacture of the connector (20), the lever (30) with the cam head (32) is an integral piece that replaces the conventional lever (60) and the compression clamp (62) shown in the prior art. Therefore, manufacture and assembly of the adjustable connector (20) are much easier and cost less than manufacturing and assembling of the conventional one.

Although the invention has been explained in relation to its preferred embodiments, many other possible modifications and variations can be made without departing from the spirit and scope of the invention as hereinafter claimed.

What is claimed is:

1. An adjustable connector for a lawn rake, the adjustable connector comprising:
    a sleeve being a tubular body, adapted to mount slidably around a handle of the lawn rake and having
        a front end;
        a sidewall; and
        a through hole defined through the sidewall of the sleeve;
    a lever pivotally attached to the sleeve and having
        a proximal end;
        a distal end;
        an elongated tab formed at the distal end; and
        a cam head formed at the proximal end and rotatably extending into the through hole in the sleeve; and
    a rake head connected to the front end of the sleeve and having multiple tines extending forward, wherein
    the cam head of the lever is a rectangular block and has:
        an inner surface;
        a curved compression face formed on the inner surface and protruding rotatable into the through hole in the sleeve;
        a front face adjacent to the curved compression face and having a curved inner edge communicating with the curved compression face;
        a rear face; and
        multiple ribs formed on the curved compression face.

2. The adjustable connector as claimed in claim 1, wherein
    the sleeve further has:
        two wings extending down from the sleeve, and each wing having:
            a front edge; and
            a pinhole; and
        a pin mounted in the pinholes in the wings and the cam head to pivotally attach the lever on the sleeve; and
    the enlarged cam head of the lever further has a pivot hole defined transversely through the cam head and pivotally mounted on the pin between the two wings to align with the pinholes in the wings.

3. The adjustable connector as claimed in claim 2, wherein the rake head is connected to the front edges of the two wings and has
    a base attached to the front edges of the wings and having:
        a bottom;
        a longitudinal center;
        a front face having an opening;
        a rear face; and
        a tine recess being L-shaped and wide, formed in the bottom of the base, extending from the longitudinal center of the base to the front face and defining the opening in the front face of the base;
    multiple tines pivotally engaging with the base, each tine having:
        a proximal end being L-shaped, corresponding to the tine recess and mounted securely and pivotally in the tine recess; and
        a distal end; and
    a tine separator being a curved L-shaped bar, mounted on and separating the multiple tines and having multiple holes slidably mounted respectively around the multiple tines.

4. An adjustable connector for a lawn rake, the adjustable connector comprising:
    a sleeve being a tubular body, adapted to mount slidably around a handle-of the lawn rake and having
        a front end;
        a sidewall; and
        a through hole defined through the sidewall of the sleeve;
    a lever pivotally attached to the sleeve and having
        a proximal end;
        a distal end;
        an elongated tab formed at the distal end; and
        a cam head formed at the proximal end and rotatable extending into the through hole in the sleeve; and
    a rake head connected to the front end of the sleeve and having multiple tines extending forward
    wherein the rake head has:
        a base attached to the front edges of the wings and having:
            a bottom;
            a longitudinal center;
            a front face having an opening;
            a rear face; and
            a tine recess being L-shaped and wide, formed in the bottom of the base, extending from the longitudinal center of the base to the front face and defining the opening in the front face of the base;

multiple tines pivotally engaging with the base, each tine having:
- a proximal end being L-shaped, corresponding to the tine recess and mounted securely and pivotally in the tine recess; and
- a distal end; and a tine separator being a curved L-shaped bar, mounted on and separating the multiple tines and having multiple holes slidably mounted respectively around the multiple tines.

* * * * *